United States Patent [19]
Bittihn et al.

[11] Patent Number: 5,169,736

[45] Date of Patent: Dec. 8, 1992

[54] ELECTROCHEMICAL SECONDARY ELEMENT

[75] Inventors: Rainer Bittihn, Idstein; Detley Hoge; Rudolf Herr, both of Kelkheim, all of Fed. Rep. of Germany

[73] Assignee: Varta Batterie Aktiengesellschaft, Hanover, Fed. Rep. of Germany

[21] Appl. No.: 727,563

[22] Filed: Jul. 9, 1991

[30] Foreign Application Priority Data

Aug. 9, 1990 [DE] Fed. Rep. of Germany ....... 4025208

[51] Int. Cl.$^5$ .................. H01M 6/14; H01M 4/58
[52] U.S. Cl. ................. 429/194; 429/197; 429/198; 429/217; 429/223
[58] Field of Search ........... 429/194, 217, 197, 198, 429/223, 192

[56] References Cited

U.S. PATENT DOCUMENTS

| | | | |
|---|---|---|---|
| 4,132,619 | 1/1979 | Klein et al. | 429/223 |
| 4,507,371 | 3/1985 | Thackeray et al. | 429/191 |
| 4,956,247 | 9/1990 | Mizazaki et al. | 429/217 |
| 4,975,346 | 12/1990 | Lecerf et al. | 429/224 |

FOREIGN PATENT DOCUMENTS 63-218156  9/1988  Japan .
63-221559  9/1988  Japan .
1-109662   4/1989  Japan .

*Primary Examiner*—Olik Chaudhuri
*Assistant Examiner*—M. Nuzzolillo
*Attorney, Agent, or Firm*—Weiser & Stapler

[57] ABSTRACT

An electrochemical secondary element with a non-aqueous electrolyte, whose charge/discharge mechanism is predicated upon the reversible intercalation of active Li+ ions in electrode materials having an open skeletal structure. The positive electrode is essentially a lithium-manganese spinel of the type $Li_qM_xMn_yO_z$ which, in addition to satisfying the expressions $0<x<0.6$ and $1.4<y<2.0$, can also contain up to 30% of other metals such as Co, in addition to Mn. The negative electrode is based on a carbon product obtained by pyrolysis from organic compounds, and serves as the recipient substance for the Li+ ions. By limiting the Li concentration in the spinel lattice to a range in which the numerical values of the variable q lie between 0 and 1.3, a lithium-poor manganese spinel is obtained. During discharging of the preponderant portion of the secondary element's capacity, the result is that a cell potential greater than 3 volt is obtained, and high cycling stability is also manifested.

10 Claims, 1 Drawing Sheet

ELECTROCHEMICAL SECONDARY ELEMENT

BACKGROUND OF THE INVENTION

This invention relates to a secondary element having a positive electrode, a negative electrode, and a non-aqueous electrolyte, in which the material of the respective electrodes forms an open grid or skeleton structure. This makes the electrode structure capable of acting as a "host" for a recipient compound, for alternately accepting and releasing electrochemically active cations during charging and discharging.

An important impetus for this invention was the recent, great increase in demand for batteries having high energy density and low weight, such as had already been achieved particularly with the lithium systems, but which are also rechargeable. This requires, among other things, that the electrodes be chemically stable in contact with the electrolyte.

Lithium electrodes do not meet these requirements when in use over extended periods of time, even in organic electrolytes with an aprotic solvent, because their cycling stability is well known to be sharply limited. This drawback can be overcome by alloying lithium with an alkaline earth metal or earth metal, preferably aluminum. By so doing, the reduced energy content of the alloyed electrode is offset by the benefit of better rechargeability and higher mechanical strength.

Another recent approach to improve the reversibility of lithium electrodes involves intercalation compounds. With such compounds, the cell's electrode incorporates a material of predetermined structure which form an appropriate "host" or recipient grid for electrochemically active species of ions that are present in the electrolyte. These ions, in this instance $Li+$, are either stored or released depending upon the polarity of an externally applied potential. During discharge, the electromotive force which is produced, and which manifests itself in the tendency to again reverse the forced intercalation or deintercalation, is used for current production.

From the outset, carbon of predetermined structural characteristics has proven suitable as the electrode material dopable with $Li+$ ions for both electrode polarities. For example, the electrodes of the electrochemical battery disclosed in German patent publication (DE-OS) 3,231,243 involve such products formed from active carbon. According to European patent application (EP-A) 165,047, the carbon material can be a pseudo-graphite of predetermined crystalline size and with a lattice expanded in the direction of the c-axis which is obtained by pyrolysis from aromatic hydrocarbons. In a secondary battery disclosed in European patent application (EP-A) 201,038, which has as an electrolyte a solution of a lithium salt in a non-aqueous solvent, such a pseudographite forms the negative electrode, and a metal chalcogenide which is also capable of being doped forms the positive electrode.

The intercalation capability of metal chalcogenides, e.g. of $WO_3$ or $TiS_2$, as well as of certain synthetic mixed oxides disclosed in U.S. Pat. No. 4,668,595, is based upon their well defined lattice layers. The same printed publication also discloses chemically stable n-type material in the form of a carbon product, which is obtained from high molecular weight components of crude oil by a controlled coking process. In such case, for the purpose of incorporating metal cations, particularly $Li+$, a certain irregularity or lack of organization in the fine structure of the product is desired.

Finally, U.S. Pat. No. 4,507,371 discloses that, in rechargeable cells, host oxides or sulfides having crystalline chemistry of the spinel type can be used as either cathode or anode materials, and even as electrolyte if no electron conductivity is present. These spinel structures have high inherent stability, or can be stabilized if needed by the incorporation of certain cations such as $Mg^{2+}$, $Zn^{2+}$, $Cd^{2+}$.

In particular, German patent publication (DE-OS) 3,736,366 discloses that pure lithium-manganese spinel, in which lattice the Li ions have high mobility, can be produced through the transformation of manganese dioxide ($MnO_2$) with lithium salts at only moderately high temperatures of 300° C. to 400° C. This is what makes such spinels suitable as the active cathode material, particularly for rechargeable galvanic elements. In the charged state, such spinels have the formula $LiMn_2O_4$, and in the discharged state, the formula $LiMnO_2$. Through acid treatment, the lithium manganese spinel can be transformed into a lithium-poor compound without modification of its spinel structure, and with only a minor contraction of the cubic lattice.

In all previously known secondary elements with cathodes including a material with spinel structure, the associated anode is either a lithium alloy, an electrically conductive polymer doped with lithium ions such as polyacetylene or polyparaphenylene, or an intermediate layer compound of the $TiS_2$-type, which has lithium ions in the intermediate layer spaces, or else it is formed of a spinel type, like the cathode.

SUMMARY OF THE INVENTION

The present invention has as an object to provide an electrochemical secondary element of high energy density, whose charge/discharge mechanism is based upon alternating intercalation and de-intercalation, preferably of $Li+$ ions in the materials of the positive and negative electrodes. It is another object to provide electrode structures which provide good chemical resistance to the electrolyte, and high cycling stability.

This object and others which will appear are achieved in accordance with the present invention by means of a secondary element having a positive electrode, a negative electrode, and a non-aqueous electrolyte, which element comprises an electrode material which forms an open grid or skeleton structure enabling it to act as a recipient substance for alternatingly taking up and releasing electrochemically active cations during charging and discharging.

The recipient substance of the positive electrode is preferably an oxidic material of spinel structure whose composition conforms to the general formula $M_xMn_yO_z$, in which M = a cation of at least one metal from Groups IIa, IVa, Va, IVb, Vb, VIb or VIII, x = a number between 0 and 0.6, and y = a number between 1.4 and 2.0, wherein the ratio y to z lies between 0.3 and 0.6.

The taking up of a cation A of a Group Ia element within the host structure produces a spinel-type electrode of the general composition $A_qM_xMn_yO_z$ in which A varies as variable q, and the recipient substance of the negative electrode is a carbon product formed by pyrolysis of organic compounds. For further details, reference is made to the description which is provided below, in view of the following drawings.

DESCRIPTION OF THE PREFERRED EMBODIMENTS

Figure 1:
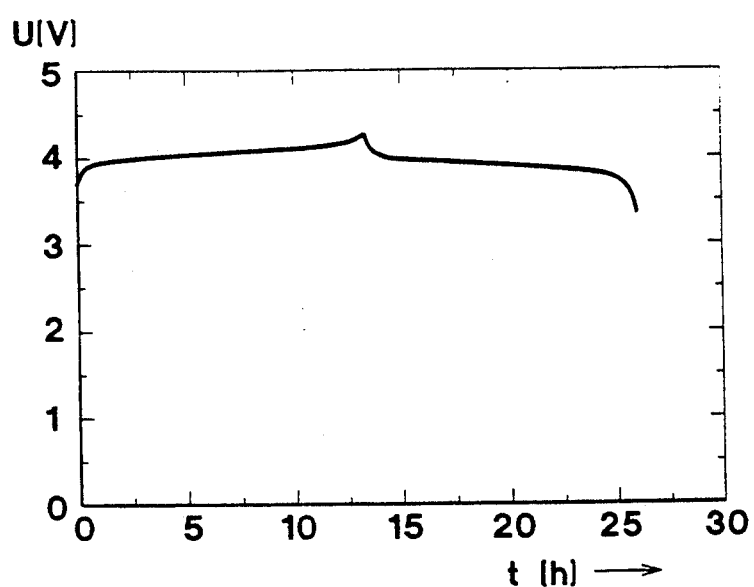
FIG. 1 shows variation in potential during a charge/discharge cycle for a positive spinel electrode measured relative to a Li/Li+ counter-electrode.

In accordance with the present invention, it has been found that the above requirements can be met in large measure by a secondary cell having a positive electrode which includes as a recipient substance an oxygen-containing material which exhibits a fine structure, like that of a spinel, and whose composition corresponds to the general formula $M_xMn_yO_z$ in which:

M = a cation of at least one metal from the Groups IIa, IVa, Va, IVb, Vb, VIb, or VIIIb;
x = a number between 0 and 0.6; and
y = a number between 1.4 and 2.0, wherein the ratio y to z iu between 0.3 and 0.6.

When the recipient structure takes up a cation A of an element from Group Ia, an electrode is obtained of the general composition $A_qM_xMn_yO_z$ and of the spinel type, in which A varies as a function of the variable q. The recipient substance of the negative electrode is n carbon product obtained through controlled thermal decomposition of organic compounds. The electrochemically active cation A, which is capable of being intercalated in both electrode structures, is preferably Li+.

In accordance with the present invention, the positive electrode of the secondary element includes a lithium-manganese spinel, $Li_qM_xMn_yO_z$, in which, depending upon the value of the parameters $0 < x < 0.6$ and $1.4 < y < 2.0$, up to about 30% of the manganese can be replaced by other metals. Replacement metals are primarily the main elements Mg, Sn, Pb, Sb and Bi from Groups IIa, IVa and Va of the periodic system, as well as the transition elements Ti, Zr, Hf, V, Nb, Ta, Cr, Mo, W, Fe, Co and Ni from Groups IVb, Vb, VIb and VIIIb.

The partial replacement of Mn-ions by M-cations in the spinel lattice sometimes requires certain defects in the lattice structure, with the result being that the recipient oxide is not always, and indeed only rarely is, a stoichiometric compound, and that the M-cations are introduced into the lattice with different valences than the Mn-ions. Correspondingly, the parameters x, y, z have a certain range of variation but are fixed for each individual compound. If the electrochemically active ion species A is diffused into the spatial or skeletal structure of the host oxide under the influence of an electric field, then the concentration of A, or Li+, can vary over a wide range.

In accordance with the present invention, the preferred numerical value of q lies between 0 and 1.3. Due to this limitation, cathodes embodying the invention are characterized as lithium-poor manganese spinels in comparison, for example, to the $Li_{1+x}Mn_2O_4$-phase (where x corresponds to q), which is disclosed in U.S. Pat. No. 4,507,371. However, these are distinguished by the fact that the overwhelming portion of their capacity can be derived at potentials greater than 3 volts as compared with Li/Li+. Furthermore, the intercalation of the Li+ ions takes place with a high degree of reversibility. As will be shown, a particularly suitable material for the positive electrode of a secondary element embodying the present invention has proven to be a cobalt-containing lithium-manganese spinel of the composition $LiCo_{0.24}Mn_{1.76}O_{4.065}$.

As the framework of the negative electrode, which functions as a recipient substance for the electrochemically active cation species A, there is used according to the present invention a carbon product which is produced from selected organic compounds through a coking or pyrolysis process. A desirable process for this purpose is a slowed coking; the so-called "delayed coking process". By this process, residues from petroleum refining, which are used as the raw material, are placed in an oven and heated to about 500° C. However, the transition speed, or dwell time in the oven, is so chosen that the coke deposition takes place only in the coking chamber which follows, and which is operated alternately with a second chamber. Removal of the coke from these chambers takes place with the assistance of a hydraulic scraping device after by-products including volatile hydrocarbons have been driven off through the introduction of steam.

A carbon product which is particularly suitable for the purposes of the present invention is so-called needle coke. This is a special coke which has previously been used in the steel industry for the production of high quality graphite electrodes for electric furnaces. Needle coke is also a product of the above-described delayed coking process, but contains contaminants such as thermal tars, decant oils, or bituminous coal tar pitch, which are all based on highly aromatic hydrocarbon compounds. For further information regarding this process, as well as for typical needle coke specifications, reference is made to an article by H. M. Feintuch, J. A. Bonilla and R. L. Godino, in the Handbook Of Petroleum Refining Processes, R. A. Meyers, McGraw Hill, New York, pages 7.1 to 7.61 (1986).

The non-aqueous electrolyte of a secondary element according to the present invention can be liquid, paste-like or solid. Preferably, the electrolyte includes a Li salt with an organic solvent, and is in liquid form. Useful for this purpose are known electrolyte salts with one of the anions $ClO_4$—, $BF_4$—, $AsF_6$, $CF_3SO_3$—, $PF_6$—, J—, or $AlClO_4$—. As a water-free solvent for these salts, there can be used both individually and in mixture with others, an organic solvent of the group tetrahydrofuran, 2-methyltetrahydrofuran, acetonitrile, propionitrile, 4-methyl-2-pentanone, butyronitrile, valeronitrile, benzonitrile, 1,2-dichlorethane, γ-butyrolactone, dimethoxyethane, methylformiate, propylene carbonate, ethylene carbonate, vinylene carbonate, dimethylformamide, sulfolane, 3-methylsulfolane, trimethylphosphate, and other like organic solvents.

In a preferred secondary cell embodying the present invention, the electrolyte is immobilized by inorganic oxygen-containing compounds such as $SiO_2$, $Al_2O_3$, $TiO_2$, MgO, $B_2O_3$, $Na_2SO_4$ or $AlPO_4$, which gel with the solvent in surface rich forms. Particularly suitable are aprotic solvents such as propylene carbonate, acetonitrile, γ-butyrolactone, nitromethane, tetrahydrofuran, methyltetrahydrofuran, dimethoxyethane or dioxolane. The finished electrodes are of a pasty or semi-solid consistency.

A different way of immobilizing the electrolyte involves forming polyether-complexes of the alkaline salts (e.g., with polyethylene oxide) which have the properties of a solid ion conductor. In such case, the lithium salt used as the electrolyte component is an ingredient of a polymeric electrolyte matrix with polyethylene oxide as the framework. Ceramic alkaline ion conductors can also be used as solid electrolytes.

Finally, the electrolyte of the secondary element embodying the present invention can also include molten salts. These include, for example, LiAlCl$_4$ which melts at 150°, or an eutectic mixture of LiCl and KCl, with a melting point of 352° C. However, particularly preferred electrolytes are so-called "room temperature salt melts", which here function as a solvent for a conventional Li-conductive salt. As examples, there are listed the following salt mixtures: 1 methyl-3-ethylimidazolium chloride/AlCl$_3$, N-butylpyridinium chloride/AlCl$_3$, phenyltrimethylammonium chloride/AlCl$_3$.

Neither the electrode materials nor the electrolytes of the secondary elements which embody the present invention pose particular difficulties for the construction of practical cells, or to the battery assembly process. For example, the electrodes can be produced in compact form, which makes them easily usable for assembly. If desired, the electrodes can be united simply by means of an adhesive. For tight constructions, and in conjunction with liquid electrolytes, the electrodes can be electrically isolated from each other with a separator material of the type which is conventionally used in lithium cells, such as polypropylene for example.

Particularly desirable is a strengthening of the electrodes by means of electrically conductive metal support structures, especially when these simultaneously perform the current take-off function. In a particularly desirable embodiment of the secondary element of the present invention, the negative electrode has a take-off conductor of nickel or high-grade steel, and the positive electrode has a take-off conductor of aluminum or high-grade steel.

Referring now to the drawings the voltage curve of FIG. 1 was obtained with a pure lithium-manganese spinel of the composition LiMn$_2$O$_4$, which was derived from the general formula Li$_q$M$_x$Mn$_y$O$_z$ for the case q=1, x=0 and y=2. The low lithium content (0<q<1.3) according to the present invention is responsible for an exceptionally high voltage level of about 4 volts during discharge.

Figure 2:
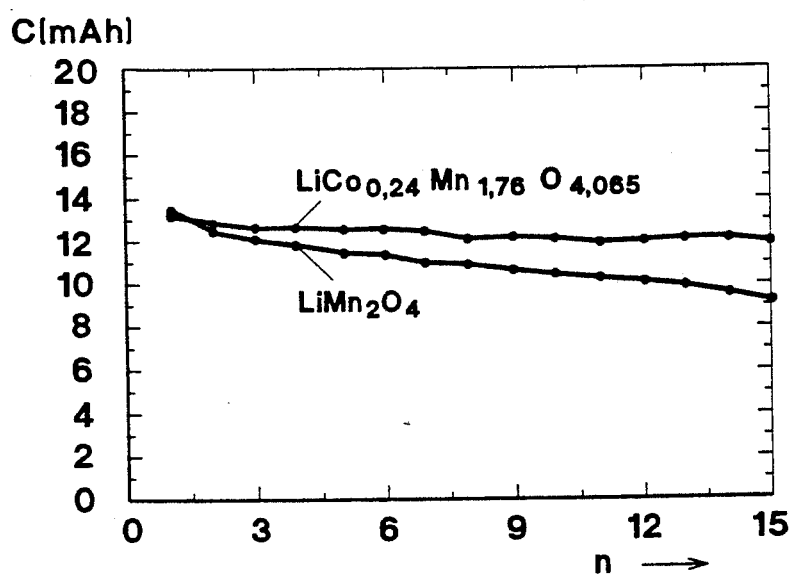
FIG. 2 shows variation in the capacity of two positive spinel electrodes embodying the present invention during cyclical charging/discharging over 15 cycles, again relative to a Li/Li+ electrode.

As shown in FIG. 2, spinel cathodes according to the present invention distinguish themselves in cyclical operation (n=number of cycles) through only slight capacity decline (capacity C in mAh). As for cycling stability, even the LiMn$_2$O$_4$ spinel was surpassed by the previously mentioned LiCo$_{0.24}$Mn$_{1.76}$O$_{4.065}$ modification. This desirable behavior results directly from the almost unimpeded take-up and release of the Li+ material by the spinel lattice, i.e., from an almost completely reversible intercalation.

Figure 3:
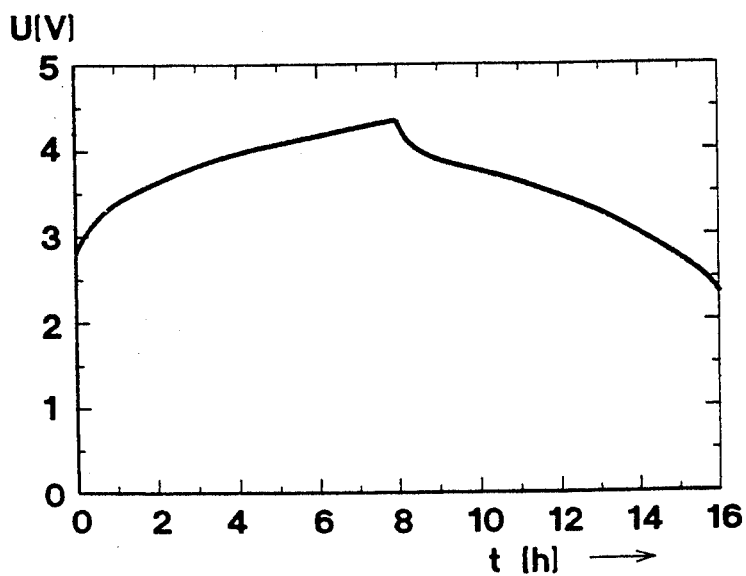
FIG. 3 shows characteristic variation during a charge/discharge cycle for an assembled secondary cell embodying the invention.

FIG. 3 shows a typical charge/discharge potential curve for a secondary cell according to the present invention, with a positive LiMn$_2$O$_4$ electrode and a negative Li+ intercalating carbon electrode. As shown, by far the greatest part of the capacity, as in the above described cases with a current (i) of 0.1 CA (for 10 hours), is discharged at a cell potential which declines from 4 volts to 3 volts.

The electrolyte was in each case a 1-normal solution of LiAsF$_6$ in propylene carbonate.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An electrochemical secondary element having a positive electrode, a negative electrode, and a non-aqueous electrolyte, which element comprises an electrode material which forms an open grid or skeleton host structure acting as a recipient substance for alternatively taking up and releasing electrochemically active cations during charging and discharging, the recipient substance of the positive electrode being an oxidic material of spinel structure whose composition conforms to the general formula M$_x$Mn$_y$O$_z$, in which M=a cation of at least one metal from Groups IIa, IVa, Va, IVb, Vb, VIb or VIIIb,
x=a number greater than 0 and less than 0.6, and
y=a number greater than 1.4 and less than 0.2,
wherein the ratio y to z lies between 0.3 and 0.6, and wherein the taking up of a cation A of a Group Ia element within the host structure produces a spinel-type electrode of the general composition A$_q$M$_x$Mn$_y$O$_z$ in which A varies as a function of a variable q, wherein q lies between 0 and 1.3, and wherein the recipient substance of the negative electrode is a carbon product formed by pyrolysis of organic compounds.

2. The electrochemical secondary element of claim 1 wherein A is constituted of Li+.

3. The electrochemical secondary element of claim 1 wherein the recipient substance of the carbon product forming the negative electrode is a needle coke.

4. The electrochemical secondary element of claim 1 wherein the electrolyte includes a Li salt with an organic solvent.

5. The electrochemical secondary element of claim 4 wherein the electrolyte is immobilized by a polymeric matrix solvent, or by the addition of an inorganic oxygen-containing compound which gels in the solvent.

6. The electrochemical secondary element of claim 5 wherein the polymeric base is polyethylene oxide.

7. The electrochemical secondary element of claim 5 wherein the gel is gelated by means selected from the group consisting of SiO$_2$, Al$_2$O$_3$, TiO$_2$, MgO, B$_2$O$_3$, Na$_2$SO$_4$ and AlPO$_4$.

8. The electrochemical secondary element of claim 1 wherein the electrolyte is constituted of a high temperature melt containing a lithium salt.

9. The electrochemical secondary element of claim 1 wherein the electrolyte is a room-temperature salt melt containing a Li salt.

10. An electrochemical secondary element having a positive electrode, a negative lithium-intercalating carbon electrode, and a non-aqueous electrolyte, which element comprises an electrode material which forms an open grid or skeleton hose structure acting as a recipient substance for alternatingly taking up and releasing electrochemically active cations during charging and discharging, the recipient substance of the positive electrode being an oxidic material of spinel structure whose composition conforms to the general formula M$_x$Mn$_y$O$_z$, in which M = a cation of at least one metal from Groups IIa, IVa, Va, IVb, Vb, VIb and VIIIb, x = a number greater than 0 and less than 0.6, and y = a number greater than 1.4 and less than 2.0, wherein the ratio y to z lies between 0.3 and 0.6, and wherein the taking up of a cation A of a Group Ia element within the host structure produces a spinel-type electrode of the general composition $A_qM_xMn_yO_z$ in which A varies as a function of a variable q, wherein q lies between 0 and 1.3, and wherein the recipient substance of the negative electrode is a carbon product formed by pyrolysis of organic compounds.

* * * * *